United States Patent
Eβfeld et al.

(10) Patent No.: US 7,909,262 B2
(45) Date of Patent: Mar. 22, 2011

(54) PRESSURE RELIEVED THERMAL REGULATOR FOR AIR CONDITIONING APPLICATION

(75) Inventors: Fritz Eβfeld, Warstein (DE); Bernhard Henke, Brilon (DE); Karl-Heinz Brinkmann, Lippstadt (DE); John M. Trantham, Hurst, TX (US)

(73) Assignee: Flow Design, Inc., Dallas, TX (US)

( * ) Notice: Subject to any disclaimer, the term of this patent is extended or adjusted under 35 U.S.C. 154(b) by 605 days.

(21) Appl. No.: 11/955,989

(22) Filed: Dec. 13, 2007

(65) Prior Publication Data

US 2008/0210895 A1 Sep. 4, 2008

Related U.S. Application Data

(60) Provisional application No. 60/870,016, filed on Dec. 14, 2006.

(51) Int. Cl.
*G05D 23/12* (2006.01)
(52) U.S. Cl. ...................... 236/99 R; 236/100
(58) Field of Classification Search .............. 236/99 R, 236/92 B, 93 B, 93 A, 99 J, 100; 62/225
See application file for complete search history.

(56) References Cited

U.S. PATENT DOCUMENTS

| | | | |
|---|---|---|---|
| 1,625,000 A * | 4/1927 | Ulmann | 236/80 R |
| 1,999,732 A * | 4/1935 | Leins | 236/99 R |
| 2,308,861 A * | 1/1943 | Clifford | 251/86 |
| 2,495,272 A * | 1/1950 | Lum | 236/1 C |
| 2,547,882 A * | 4/1951 | Norton | 236/99 R |
| 2,577,903 A * | 12/1951 | McGrath | 62/225 |
| 2,579,034 A * | 12/1951 | Dube et al. | 62/211 |
| 2,938,384 A * | 5/1960 | Soreng et al. | 60/527 |
| 3,111,816 A * | 11/1963 | Tilney et al. | 62/212 |

(Continued)

FOREIGN PATENT DOCUMENTS

DE 103 03 828 8/2004

OTHER PUBLICATIONS

Notifiction of Transmittal of the International Search Report and the Written Opinion of the International Searching Authority, or the Declaration, PCT/US/2007/087533, dated Jul. 21, 2009, 13 pages.

*Primary Examiner* — George Nguyen
(74) *Attorney, Agent, or Firm* — Baker Botts L.L.P.

(57) ABSTRACT

According to one embodiment of the invention, a control valve for regulating temperature comprises a conduit, a fluid limiter, a restoring actuator, an opening actuator, and a restoring actuator chamber. The conduit has an inlet, an outlet, and an opening between the inlet and the outlet. The inlet is operable to receive fluid into the conduit and the outlet is operable to dispense of fluid out of the conduit. The fluid limiter is operable to at least partially cover the opening and thereby resist flow of fluid through the opening. The restoring actuator is operable to provide a force that moves the fluid limiter toward the opening to resist flow of fluid through the opening. The opening actuator is operable to provide a second force that moves the fluid limiter away from the opening to allow the flow of fluid through the opening. The opening actuator is activated based on a temperature of fluid in the conduit. The restoring actuator chamber is disposed around the restoring actuator and has a passage in communication with fluid upstream of the opening.

25 Claims, 2 Drawing Sheets

U.S. PATENT DOCUMENTS

| | | | | |
|---|---|---|---|---|
| 3,838,812 A * | 10/1974 | Johnson | | 236/99 R |
| 4,158,437 A * | 6/1979 | Nielsen | | 236/92 B |
| 4,214,698 A * | 7/1980 | Josefsson | | 236/42 |
| 4,236,669 A * | 12/1980 | Kountz | | 236/92 B |
| 4,288,033 A * | 9/1981 | Wisyanski | | 236/93 A |
| 4,453,668 A * | 6/1984 | Abel | | 236/34.5 |
| 4,557,252 A * | 12/1985 | Dinh | | 126/588 |
| 4,883,225 A * | 11/1989 | Kitchens | | 236/34.5 |
| 4,959,973 A * | 10/1990 | Tanaka et al. | | 62/225 |
| 5,018,665 A * | 5/1991 | Sulmone | | 236/93 A |
| 5,257,737 A * | 11/1993 | Vestergaard | | 236/92 B |
| 5,984,197 A * | 11/1999 | Surgarek | | 236/93 A |
| 6,299,071 B1 | 10/2001 | Fiedrich | | |
| 6,360,956 B1 * | 3/2002 | Taylor et al. | | 236/12.2 |
| 6,565,009 B2 * | 5/2003 | Yano et al. | | 236/92 B |
| 7,255,286 B2 * | 8/2007 | Ord et al. | | 236/93 A |
| 2006/0113399 A1 * | 6/2006 | Maraux et al. | | 236/93 R |
| 2008/0041971 A1 * | 2/2008 | Trantham et al. | | 236/93 A |
| 2008/0210895 A1 * | 9/2008 | Essfeld et al. | | 251/63.6 |

* cited by examiner

PRESSURE RELIEVED THERMAL REGULATOR FOR AIR CONDITIONING APPLICATION

RELATED APPLICATIONS

Pursuant to 35 U.S.C. §119 (e), this application claims priority to U.S. Provisional Patent Application Ser. No. 60/870,016, entitled PRESSURE RELIEVED THERMAL REGULATOR FOR AIR CONDITIONING APPLICATION filed Dec. 14, 2006. U.S. Provisional Patent Application Ser. No. 60/870,016, is hereby incorporated by reference.

TECHNICAL FIELD OF THE INVENTION

This invention relates generally to the field of heat transfer and, more particularly, to a pressure relieved thermal regulator for air conditioning application.

BACKGROUND OF THE INVENTION

A variety of different heat transfer systems use water or other fluids to transfer heat or thermal energy between one or more production units and one or more loads. Such systems are often referred to as hydronic systems.

SUMMARY OF THE INVENTION

According to one embodiment of the invention, a control valve for regulating temperature comprises a conduit, a fluid limiter, a restoring actuator, an opening actuator, and a restoring actuator chamber. The conduit has an inlet, an outlet, and an opening between the inlet and the outlet. The inlet is operable to receive fluid into the conduit and the outlet is operable to dispense of fluid out of the conduit. The fluid limiter is operable to at least partially cover the opening and thereby resist flow of fluid through the opening. The restoring actuator is operable to provide a force that moves the fluid limiter toward the opening to resist flow of fluid through the opening. The opening actuator is operable to provide a second force that moves the fluid limiter away from the opening to allow the flow of fluid through the opening. The opening actuator is activated based on a temperature of fluid in the conduit. The restoring actuator chamber is disposed around the restoring actuator and has a passage in communication with fluid upstream of the opening.

Certain embodiments of the invention may provide numerous technical advantages. For example, a technical advantage of one embodiment may include the capability to choose the temperature of regulation so that a particular heat exchanger always receives the appropriate amount of coolant flow under variable loading conditions. Other technical advantages of other embodiments may include the capability to regulate the temperature of the fluid based on a setting despite pressure fluctuations. Still another technical advantage of other embodiments may include the capability for the thermal actuator to be changed without creating an opening from the water to the surrounding air, thereby allowing this operation to be done without shutting down the surrounding pipework.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

For a more complete understanding of example embodiments of the present invention and its advantages, reference is now made to the following description, taken in conjunction with the accompanying drawings, in which.

DETAILED DESCRIPTION OF THE INVENTION

It should be understood at the outset that although example embodiments of the present invention are illustrated below, the present invention may be implemented using any number of techniques, whether currently known or in existence. The present invention should in no way be limited to the example embodiments, drawings, and techniques illustrated below, including the embodiments and implementation illustrated and described herein. Additionally, the drawings are not necessarily drawn to scale.

Figure 1:
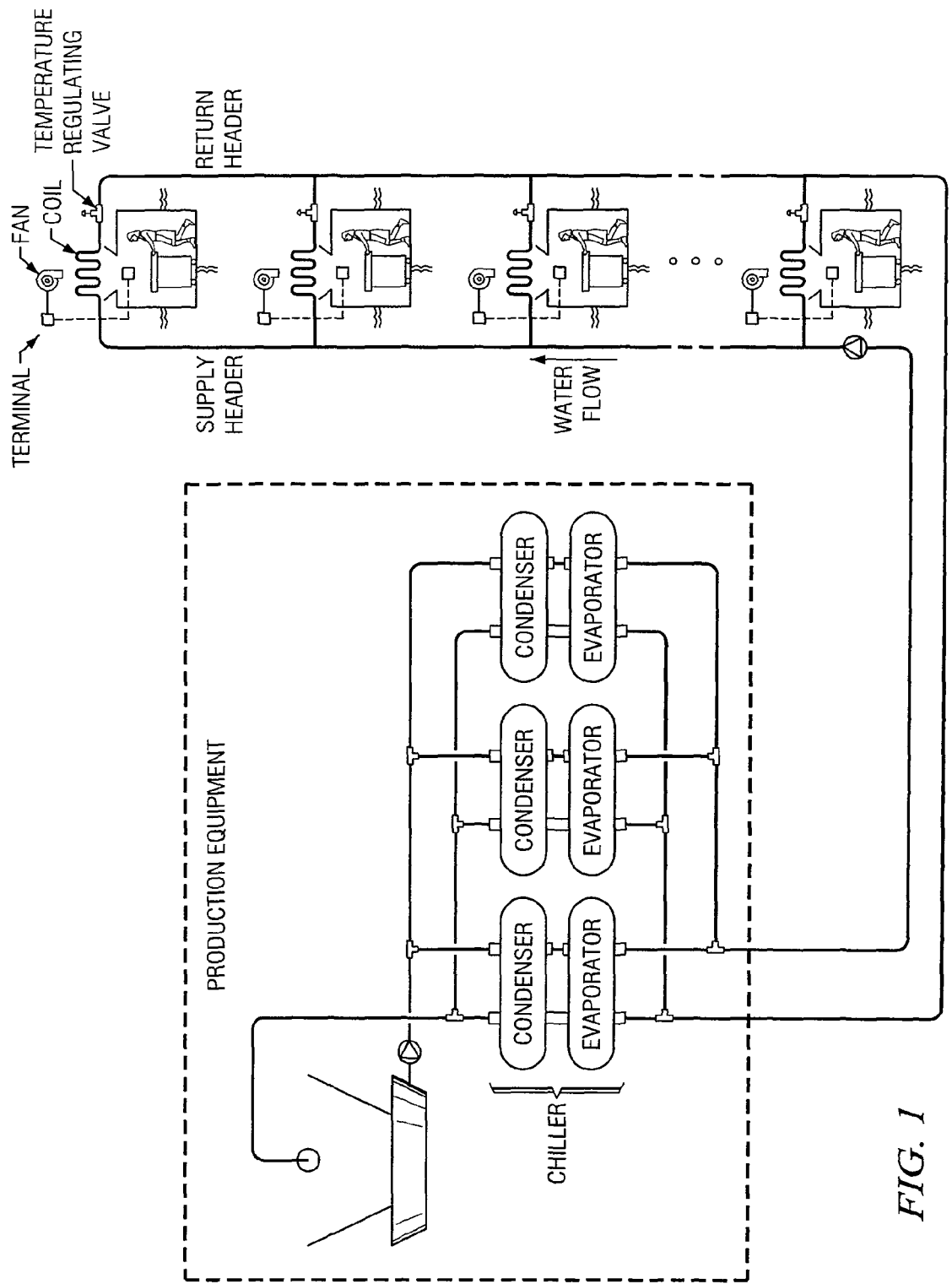
FIG. 1 is an example system in which embodiments of the invention may be utilized.

FIG. 1 is an example system in which embodiments of the invention may be utilized. Embodiments of the invention may apply to hydronic cooling systems, sometimes known as "chilled water" systems. In such systems a chiller provides cold fluid (e.g., including, but not limited to, water) to many different heat transfer terminals through a network of piping. The cold fluid rises in temperature as it passes through the various terminal units, as a result of heat or thermal energy being removed from various "loads." That is, the thermal energy is transferred to the fluid. These loads can include, but are not limited to, air in rooms of buildings or various industrial processes. In particular embodiments, fans associated with terminals may either change in speed or turn on and off in response, for example, to the temperature of a particular room in a building. In particular embodiments, a control valve may be used to maintain a constant temperature of fluid returning from the terminal. An example of such a valve is described below in the embodiment of FIG. 2. The result in particular embodiments may be an extremely low flow of fluid when there is no load on the terminal (such as when the fan speed was slow or the fan was off) and an increased flow of fluid with an increased load.

Figure 2:
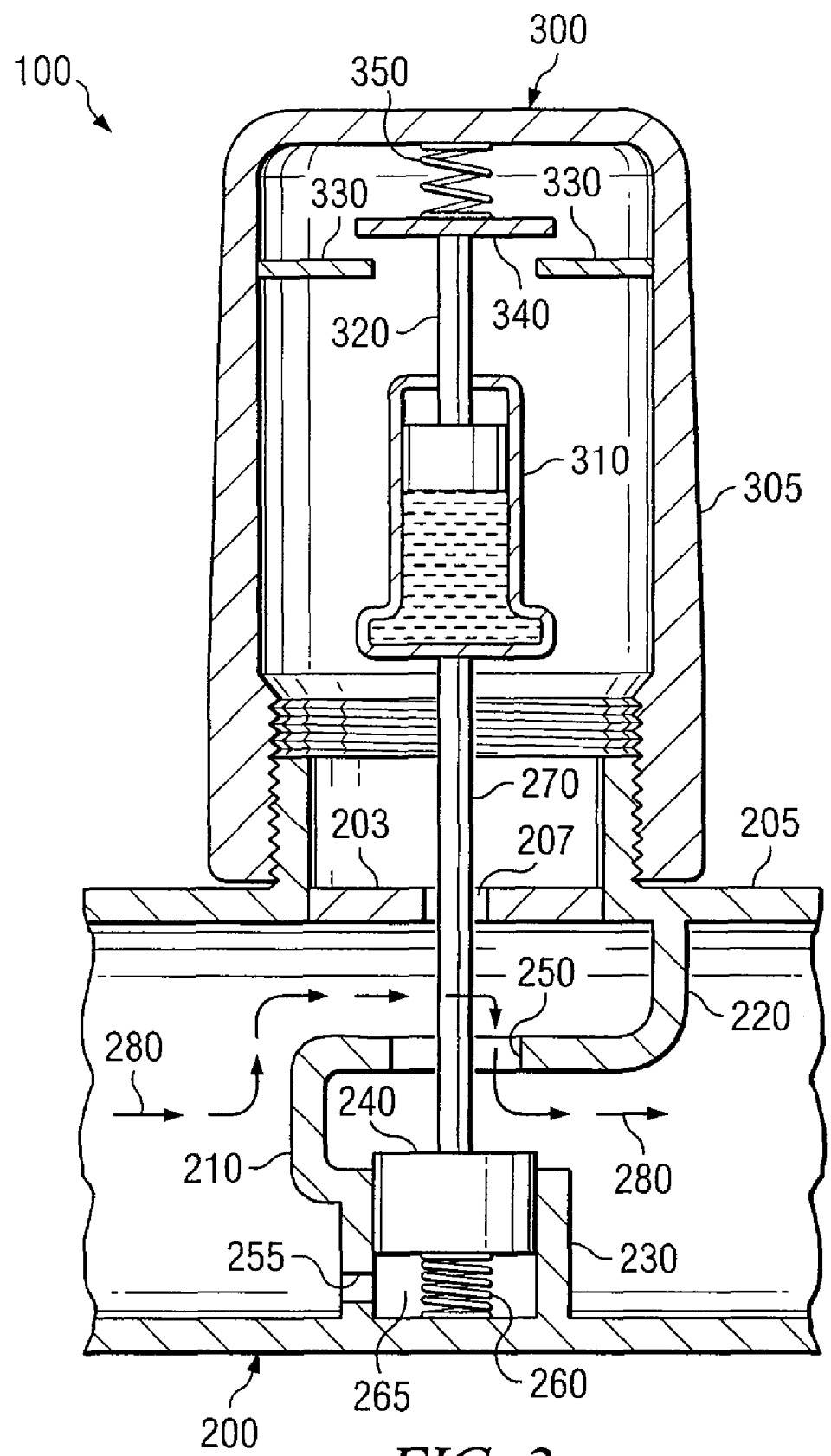
FIG. 2 is a control valve, according to an embodiment of the invention.

FIG. 2 is a control valve 100, according to an embodiment of the invention. The control valve 100 of FIG. 2 may be placed in a variety of locations including, but not limited to, between the terminal and the return header line shown in FIG. 1. In particular embodiments, the control valve 100 can be used to control the amount of return fluid flow provided to the return header line shown in FIG. 1 as a function of the temperature of the fluid provided to the control valve 100.

The control valve 100 in this embodiment includes a valve housing 200 and an actuator housing 300. The valve housing 200 contains components, which facilitate the closing of an opening 250 in the valve housing and the actuator housing 300 include components which facilitate the opening of the opening 250.

In the embodiment of FIG. 2, the valve housing 200 include a conduit body 205, obstructions 210, 220, and 230; a plunger 240; an opening 250; a restoring spring 260; and a communication rod 270. In operation, the obstructions 210, 220, and 230 work against a flow of fluid (indicated by arrows 280) through the valve housing 200 while the opening 250 allows the flow of fluid (indicated by arrows 280) through the valve housing 200. The plunger 240 selectively covers the opening 250 upon receiving force from one or both of the force of the restoring spring 260 and an external force communicated through the communication rod 270.

The communication rod 270 is in communication with the actuator housing 300. In the embodiment of FIG. 2, the communication rod 270 communicates the temperature of the fluid to the actuator housing 300. In particular embodiments the communication rod 270 may be brass or other type of metal operable to conduct thermal energy.

In this particular embodiments, there is a seal 207 between a wall 203 of the conduit body 205 and the communication rod 270. The seal 207 allows axial movement of the communication rod 270 while preventing entry of fluid into the actuator housing 300 This creates the possibility of replacing the actuator housing 300, along with the associated components 305, 310. 320, 330, 340, and 350, without having to isolate the valve housing 200 from the surrounding pipework. In other embodiments, there may not be a seal, thereby allowing fluid into the actuator housing 300.

In the embodiment of FIG. 2, the actuator housing 300 includes a housing body 305, a chamber 310, a piston rod 320, limiters 330, a limiter stop 340, and an overtravel spring 350.

The housing body 305 is threadingly engaged with the conduit body 205. In particular embodiments, this threading engagement allows an initial setting of the position of the communication rod 270.

The chamber 310 includes a heat sensitive substance operable change volume when subjected to a change in temperature. In particular embodiments, the heat sensitive substance may comprise water, oil, wax, or other suitable substances, including combinations thereof. In one embodiment, heat sensitive substance may comprise an alkane hydrocarbon. In the illustrated embodiment, heat sensitive substance comprises a mixture of different types of paraffin having different melting points.

The piston rod 320 extends into and out of the chamber as the mixture of paraffin melts or solidifies. In this particular embodiment, when the mixture of paraffin melts, the volume—a characteristic of the heat sensitive substance—increases, causing the piston rod 320 to move out of the chamber 310.

The overtravel spring 350 resists the piston rod 320, causing the chamber 310 and communication rod 270 to be pushed down when the piston rod 320 exits the chamber 310. To avoid overtravel spring 350 from going too far downward, the overtravel spring 350 is coupled to a limiter stop 340, which are resisted by limiters 330. In operation, when the chamber 310 and communication rod 270 can no longer move downward (for example, they have reached their maximum level), the overtravel spring 350 compensates for such "overtravel" by compressing and allowing the combination of the piston rod 320 to move up when chamber 310 and communication rod 270 can no longer move down. This action prevents excessive pressure from building up inside chamber 310.

In operation, the initial set point of the communication rod 270 is set by the amount of threading between the housing body 305 and the conduit body 205. As thermal energy received in the flow of fluid (indicated by arrows 280) increases, the increase in the thermal energy is communicated through the communication rod 270 up to the chamber 310 in the actuator housing 300. As the mixture of paraffin wax in the chamber 310 melts, the volume inside the chamber 310 increases, thereby forcing the piston rod 320 out of the chamber 310. The resistance to the piston rod 320 by the overtravel spring 350 forces the chamber 310 and communication rod 270 downward to push the plunger 240 out of the way of the opening 250. The downward movement of the plunger 240 compresses the restoring spring 260.

As temperature of the fluid decreases, the opposite occurs with the piston rod 320 retracting into the chamber 310 (due to decreased volume in the now-solidifying mixture of paraffin) and the restoring spring 260 forcing movement of the plunger 240 back over the opening 250.

This operation in particular embodiments can allow a fixed, desired return water temperature on the downstream side of the opening 250. That is, until the desired temperature of the fluid is reached, the mixture of paraffin in the chamber 310 won't melt (from thermal energy communicated from the communication rode 270) and the plunger 240 will not be moved out the way of the opening 250. The result as in particular embodiments as indicated above may be an extremely low flow of fluid when there is no load on the terminal (such as when the fan speed was slow or the fan was off) and an increased flow of fluid with an increased load.

In particular embodiments the mixture of paraffins may be designed so that melting takes place over a range of temperatures, with the total travel of the actuator being greater than the travel required to open or close the valve. In such embodiments, the temperature of regulation may be set by adjusting the threading engagement between actuator housing 305 and conduit housing 205.

In particular embodiments there may be a passage 255 which allows the pressure from the area of the valve upstream of opening 250 to be transmitted into chamber 265 (around spring 260). This pressure acting on the opposite face of plunger 240 counteracts the pressure from opening 250, thereby allowing the valve to function at differential pressures much higher than otherwise would be possible.

Modifications, additions, or omissions may be made to the control valve 100. For example, the components of the control valve 100 may be integrated or separated according to particular needs. Moreover, the operations of the control valve 100 may be performed by more, fewer, or other components.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A control valve for regulating temperature, the control valve comprising:
    a conduit having an inlet, an outlet, and an opening between the inlet and the outlet, the inlet operable to receive fluid into the conduit and the outlet operable to dispense of fluid out of the conduit;
    a fluid limiter operable to at least partially cover the opening and thereby resist flow of fluid through the opening;
    a restoring actuator operable to provide a force to move the fluid limiter toward the opening to resist flow of fluid through the opening;
    an opening actuator operable to provide a second force operable to move the fluid limiter away from the opening to allow the flow of fluid through the opening, the opening actuator activated based on a temperature of fluid in the conduit, the opening actuator comprising an opening actuator chamber with a heat sensitive material that changes a characteristic upon receipt of thermal energy, the change in characteristic of the heat sensitive material attributing to at least a portion of the second force;
    a communication rod coupled to the fluid limiter and the chamber, the communication rod operable to communicate thermal energy from the fluid traveling through the conduit to the heat sensitive material; and a restoring actuator chamber disposed around the restoring actuator, the restoring actuator chamber having a passage in communication with fluid upstream of the opening.

2. The control valve of claim 1, wherein the opening actuator is activated based on a temperature of fluid in the conduit located upstream of the opening.

3. The control valve of claim 1, wherein the opening actuator is removeably coupleable to the conduit.

4. The control valve of claim 1, wherein the restoring actuator is a spring.

5. The control valve of claim 1, wherein the change in characteristic of the heat sensitive material is a change in volume.

6. The control valve of claim 1, wherein the heat sensitive material is an alkane hydrocarbon.

7. The control valve of claim 1, further comprising:
a piston rod operable to move in and out of the opening actuator chamber, the piston rod coupled to the fluid limiter, wherein
the change in characteristic of the heat sensitive material forces movement of the piston rod out of the opening actuator chamber, and
the movement of the piston rod out of the chamber forces movement of the opening actuator chamber, the communication rod, and the fluid limiter.

8. The control valve of claim 7, further comprising:
an overtravel actuator operable to resist movement of the piston rod moving out of the opening actuator chamber, the resistance to movement by the overtravel actuator forcing the opening actuator chamber and the communication rod to move the fluid limiter when the piston rod moves out of the opening actuator chamber.

9. The control valve of claim 8, wherein the overtravel actuator is further operable to prevent excessive build up of pressure inside the opening actuator chamber.

10. A control valve for regulating temperature, the control valve comprising:
a conduit having an inlet, an outlet, and an opening between the inlet and the outlet, the inlet operable to receive fluid into the conduit and the outlet operable to dispense of fluid out of the conduit;
a fluid limiter operable to at least partially cover the opening and thereby resist flow of fluid through the opening;
a restoring actuator operable to provide a force to move the fluid limiter toward the opening to resist flow of fluid through the opening;
an opening actuator removeably coupled to the conduit and operable to provide a second force operable to move the fluid limiter away from the opening to allow the flow of fluid through the opening, the opening actuator activated based on a temperature of fluid in the conduit, the opening actuator comprising an opening actuator chamber with a heat sensitive material that changes a characteristic upon receipt of thermal energy, the change in characteristic of the heat sensitive material attributing to at least a portion of the second force; and
a communication rod coupled to the fluid limiter and the chamber, the communication rod operable to communicate thermal energy from the fluid traveling through the conduit to the heat sensitive material.

11. The control valve of claim 10, further comprising:
a restoring actuator chamber disposed around the restoring actuator, the restoring actuator chamber having a passage in communication with fluid upstream of the opening.

12. The control valve of claim 10, wherein the opening actuator is activated based on a temperature of fluid in the conduit located upstream of the opening.

13. The control valve of claim 10, wherein the change in characteristic of the heat sensitive material is a change in volume.

14. The control valve of claim 10, wherein the heat sensitive material is an alkane hydrocarbon.

15. The control valve of claim 10, further comprising:
a piston rod operable to move in and out of the opening actuator chamber, the piston rod coupled to the fluid limiter, wherein
the change in characteristic of the heat sensitive material forces movement of the piston rod out of the opening actuator chamber, and
the movement of the piston rod out of the opening actuator chamber forces movement of the opening actuator chamber, the communication rod, and the fluid limiter.

16. The control valve of claim 15, further comprising:
an overtravel actuator operable to resist movement of the piston rod moving out of the opening actuator chamber, the resistance to movement by the overtravel actuator forcing the opening actuator chamber and the communication rod to move the fluid limiter when the piston rod moves out of the opening actuator chamber.

17. The control valve of claim 16, wherein the overtravel actuator is further operable to prevent excessive build up of pressure inside the opening actuator chamber.

18. A control valve for regulating temperature, the control valve comprising:
a conduit having an inlet, an outlet, and an opening between the inlet and the outlet, the inlet operable to receive fluid into the conduit and the outlet operable to dispense of fluid out of the conduit, the conduit operable to be positioned between a terminal and a return header line of a hydronic cooling system;
a fluid limiter operable to at least partially cover the opening and thereby resist flow of fluid through the opening;
a first actuator operable to provide a first force operable to move the fluid limiter either toward the opening to resist flow of fluid through the opening or away from the opening to allow the flow of fluid through the opening;
a second actuator operable to provide a second force operable to move the fluid limiter in a direction opposite the direction in which the first force is the first force is operable to move the fluid limiter, the second actuator activated based on a temperature of fluid in the conduit, the second actuator comprising a chamber with a heat sensitive material that changes a characteristic upon receipt of thermal energy, the change in characteristic of the heat sensitive material attributing to at least a portion of the second force; and
a communication rod coupled to the fluid limiter and the chamber, the communication rod operable to communicate thermal energy from the fluid traveling through the conduit to the heat sensitive material.

19. The control valve of claim 18, wherein the second actuator is activated based on a temperature of fluid in the conduit located upstream of the opening.

20. The control valve of claim 18, wherein the second actuator is removeably coupleable to the conduit.

21. The control valve of claim 18, wherein the change in characteristic of the heat sensitive material is a change in volume.

22. The control valve of claim 18, wherein the heat sensitive material is an alkane hydrocarbon.

23. The control valve of claim 18, further comprising:
a piston rod operable to move in and out of the chamber, the piston rod coupled to the fluid limiter, wherein
the change in volume of the heat sensitive material forces movement of the piston rod out of the chamber, and
the movement of the piston rod out of the chamber forces movement of the chamber, the communication rod, and the fluid limiter.

24. The control valve of claim 23, further comprising:
an overtravel actuator operable to resist movement of the piston rod moving out of the chamber, the resistance to movement by the overtravel actuator forcing the chamber and the communication rod to move the fluid limiter when the piston rod moves out of the chamber.

25. The control valve of claim 24, wherein the overtravel actuator is further operable to prevent excessive build up of pressure inside the chamber.

* * * * *